United States Patent
Cherry

(10) Patent No.: US 6,320,956 B1
(45) Date of Patent: Nov. 20, 2001

(54) MULTIPLE CLIENT REMOTE AGENT NETWORK METHOD

(75) Inventor: Richard Cherry, Miami, FL (US)

(73) Assignee: Willow CSN, Inc., Miramar, FL (US)

( * ) Notice: Subject to any disclaimer, the term of this patent is extended or adjusted under 35 U.S.C. 154(b) by 0 days.

(21) Appl. No.: 09/237,517

(22) Filed: Jan. 25, 1999

(51) Int. Cl.$^7$ .................................................. H04M 5/00
(52) U.S. Cl. .............................. 379/265.02; 379/265.01; 379/265.11; 379/265.12; 379/266.09
(58) Field of Search ..................... 379/88.17, 88.21, 379/113, 212, 242, 265, 266, 265.01, 265.02, 265.11, 265.12, 265.13, 266.09, 309

(56) References Cited

U.S. PATENT DOCUMENTS

| | | |
|---|---|---|
| 5,073,890 | 12/1991 | Danielsen . |
| 5,267,305 * | 11/1993 | Prohs et al. .......................... 379/233 |
| 5,291,550 * | 3/1994 | Levy et al. ........................... 379/242 |
| 5,291,551 | 3/1994 | Conn et al. . |
| 5,459,780 | 10/1995 | Sand . |
| 5,487,243 | 1/1996 | Hale et al. . |
| 5,546,456 | 8/1996 | Vilsoet et al. . |
| 5,557,667 | 9/1996 | Bruno et al. . |
| 5,563,937 | 10/1996 | Bruno et al. . |
| 5,586,178 | 12/1996 | Koenig et al. . |
| 5,633,924 | 5/1997 | Kaish et al. . |
| 5,703,943 | 12/1997 | Otto . |
| 5,715,306 | 2/1998 | Sunderman et al. . |
| 5,737,405 | 4/1998 | Dezonno . |
| 5,742,596 | 4/1998 | Baratz et al. . |
| 5,742,675 | 4/1998 | Kilander et al. . |
| 5,792,600 | 8/1998 | Blaha et al. . |
| 5,884,032 * | 3/1999 | Bateman et al. ..................... 709/204 |
| 6,047,060 * | 4/2000 | Fedorov et al. ................ 379/265.02 |
| 6,175,564 * | 1/2001 | Miloslavsky et al. ............... 370/352 |

* cited by examiner

*Primary Examiner*—Ahmad Matar
*Assistant Examiner*—Bing Bui
(74) *Attorney, Agent, or Firm*—Lott & Friedland, PA

(57) ABSTRACT

A method of providing call center remote agents the ability to conduct transactions for a plurality of call center clients while providing integrated voice, data, supervisory monitoring and payroll services to both remote agent and call center client. Customer initiated inbound calls are routed through a voice switch which is dynamically controlled by a network coordinator. The network coordinator monitors a plurality of authorized remote agents signed on through computer terminals trained to process customer calls for one or more call center clients. Rather than hold a customer in a traditional call center queue until another local agent becomes available, the network coordinator selects an available and authorized remote agent to accept the call and directs the voice switch to connect the customer to the remote agent. The remote agent then accesses the call center client's transactional computer through the remote agent's terminal to process the customer initiated transaction whether it is sales, reservations, information or the like.

10 Claims, 2 Drawing Sheets

MULTIPLE CLIENT REMOTE AGENT NETWORK METHOD

FIELD OF INVENTION

The present invention relates generally to a system enabling remotely located agents to work as members of an automatic call distributor ("ACD") team, and more particularly, for remote agents to service a plurality of different call center clients.

BACKGROUND OF THE INVENTION

Call centers handle an increasing volume of telephonic inquiries for sales, information, customer support and other services. Typical call centers provide the ability to route a plurality of incoming, customer-initiated calls to call agents which provide sales, information, or support. An ACD is utilized to selectively route the incoming calls. An ACD generally refers to a device that receives incoming calls, answers with a taped announcement, holds the calls with background music or a message, then automatically assigns the call on a first come first serve basis to the next available call agent. However, newer ACD systems selective route the incoming calls based on various additional information such as the number of calls, the number of the caller, the geographic location of the caller, past caller data, and other relevant criteria. Once the ACD has evaluated the inbound caller's information, if any, the ACD then searches for an available call agent to service the call. The number of agents within the call center is often limited by the office space available for the agents to operate. A frequent problem experienced by call centers is the situation where there too few call agents to handle the number of incoming customer calls. In those situation, the customer is frequently put on hold and made to wait until a call agent becomes available. However, many potential customers, when faced with an extended wait, may simply terminate the call before the call center has the opportunity to conduct a business transaction, thereby causing an economic loss. Additionally, customers calling for support or information may become disgruntled or unsatisfied with a business that is unable to provide a sufficient number of call agents to service the call in a timely manner.

For most applications, an agent requires both a voice and data connection. The agent audibly communicates with the customer through a typical telephone line connection and records whatever transactions take place through a computer terminal networked to the call center's record system. Modem advancements in the field of electronics, computers and telecommunications have created standardized network protocols and hardware, yielding a constantly advancing global information infrastructure. Local area networks ("LANs") based in a single geographic location have given rise to wide area networks ("WANs") which efficiently interconnect information systems between large geographic distances. Both home and business computers currently sold offer integrated or optional components to communicate through standard networks including the Internet.

Many problems experienced in conventional call centers are rooted in the fact that operations are both physically and geographically confined. Large call centers may select a geographically attractive location only to find a limited workforce in that area. Large call centers typically pay for the training of their call agents and simultaneously experience a high turnover rate. Furthermore, should the customer initiated call exceed the capacity of the call center, physical expansion of the facilities is costly.

Hence, there have been recent developments in the field of telecommunications to enable remote agents (sometimes called "home agents") to service overflow or regular customer initiated incoming calls. The benefits are obvious. Remote agents may work from home reducing the cost of maintaining large call center locations. The equipment and software needed to implement remote communications are widely available. Remote agents gain the benefit of foregoing commuting to a geographically distant office, avail themselves of flexible schedules, reduce the burden of reliance on child care or other similar circumstances. Furthermore, remote agent opportunities are particularly beneficial to persons with disabilities who may have special needs and require more flexible working conditions and schedules.

Previous attempts have been made to implement remote agent operations such as described in U.S. Pat. No. 5,459,780 to Sand (the '780 patent); U.S. Pat. No. 5,291,551 to Conn et al (the '551 patent); U.S. Pat. No. 5,073,890 to Danielsen (the '890 patent); all of which are incorporate herein by reference.

U.S. Pat. No. 5,459,780 to Sand (the '780 patent) describes a work at home agent ACD comprising an ACD host switch, an agent switch, an intelligent agent workstation, a data network, a home agent server ("HAS"), a host processor, and a management information system ("MIS"), whereby call traffic routed through a public switched telephone network ("PSTN") is distributed by the ACD host switch to the agent switch and received by the workstation. The workstation receives voice signals from the agent switch and also transmits connection status, order processing, and other information via the data network to the HAS. The HAS transmits the data to a host processor which in turn communicates with the MIS, which monitors the distribution traffic and controls the ACD host switch to optimize call distribution, particularly when caller traffic justifies maintaining an open voice path to the remote agent to reduce call setup time.

U.S. Pat. No. 5,291,551 to Conn et al (the '551 patent) describes a home agent telecommunication system comprising one or more home agents having a voice terminal and a computer terminal to access a transaction processing center. The transaction processing center may comprise a catalog order facility, a travel reservation entity, a stock brokerage, or the like. A customer call is received by an LEC which is routed to a PSTN and received by a second exchange which serves the geographic area encompassed by the transaction processing center. The transaction processing center designates the home agent assigned to receive the call which is routed across a combined voice and data line. The perceived benefit of this system is that the home agent is not continuously connected to the transaction processing center on a line that may remain idle much of the time.

U.S. Pat. No. 5,073,890 to Danielsen (the '890 patent) describes a remote agent operation for automatic call distributors utilizing ISDN comprising a remote agent position, a customer telephone, and a remote database, whereby a session initiates when the remote agent position is located near a local switch which connects to an ACD host switch via a telecommunications network. A front-end process to direct calls from the customer telephone to an available remote agent position. The local switch converts message data from a SS7 network format to an ISDN standard used by the remote agent position. The perceived benefit of this system is the economical placement of remote agents using ISDN to nearby local telecommunication switching systems instead of requiring them to be close to the ACD host switch.

However, none of the systems in the prior art describe a remote agent system capable of handling a plurality of different call centers. A typical call center may only require the use of remote agents during certain periods of high inbound call traffic. Therefore, it is costly and inefficient to pay for a remote agent that is not being utilized during periods of low caller traffic. However, should an unexpected surge in caller traffic occur, current systems lack the ability to immediately access a base of highly qualified, motivated remote agents.

From the remote agent's point of view, working for a singular call center has distinct disadvantages. The income base of the remote agent is dependent on the singular call center's ability to utilize him or her. For example, many call centers servicing catalog sales may experience a flood of calls during the holiday season whereby there is sufficient work for the remote agent to handle the overflow. However, during the off-season, the call center may be unable to utilize or employ the remote agent. Furthermore, should a remote agent wish to handle additional work, he or she is locked into the schedule of a single call center and its ability to provide work to the agent.

Consequently, there is a need in the art for a remote agent system whereby the remote agents are trained and authorized to receive calls for a plurality of different call centers.

There is a further need in the art for a remote agent system that establishes a low employee turnover rate and a high degree of professionalism on the part of the remote agent.

There is also a need for a call center system which provides performance evaluation and supervision of the remote agent in addition to providing payroll services for the call center client.

SUMMARY OF THE INVENTION

The present invention solves significant problems in the art by providing a method of automatic call distribution (ACD) service to one or more remotely located agents trained to service calls for a plurality of client call centers, comprising the steps of receiving a customer-initiated telephone call at a call center, routing the customer-initiated telephone call through a long distance carrier to a voice switch, the voice switch transmitting an array of caller information relating to the customer-initiated telephone call to a network coordinator servicing a plurality of different call centers, the network coordinator identifying at least one remotely located agent trained and authorized to receive the customer-initiated telephone call for the call center, and the network coordinator routing the customer-initiated telephone call from the customer servicing central office to the designated remote agent.

The array of caller information resolved from the voice switch may include the caller's telephone number, whether they are calling from a business or residential line, past caller history and other demographics.

The network coordinator is able to track the number of calls handled by a remotely located agent for the call center and provides payroll services for the call center on behalf of the remotely located agent The network coordinator may also maintain statistical records of each customer-initiated telephone call and provide them to the call center.

As an alternative to processing the calls through the call center's ACD, incoming customer-initiated calls may be routed directly to the voice switch, bypassing the call center entirely until a transaction is placed by the remotely located agent. In order to facilitate communication that does not interfere with concurrent voice calls, electronic mail may be utilized for communication between the network coordinator, the remotely located agent and the call center.

By accessing the features of the voice switch, the network coordinator may monitor the voice conversations taking place in the customer-initiated call and provide access to the voice conversations to the call center. Using the same technology, the remotely located agent handling a customer-initiated telephone call may request supervisory assistance from the call center wherein a supervisor at the call center may tap into the voice switch to assist in customer-initiated telephone call.

In a preferred embodiment of the invention, the remote agents have the opportunity to select from a plurality of client training courses. For example, an agent may select training to handle sales for a catalog ordering company and an airline reservation company. The agent develops a personal interest in learning the operations of each client by paying for the training. Furthermore, because the agent has a personal investment in the training process, the turnover rate is greatly reduced.

Once training is completed and the remote agent is authorized to handle calls for one or more clients, the remote agent is provided with the appropriate communications connections to service each client. The equipment comprises both a voice and data connection. The voice and data path may be combined using well known configurations such as integrated services digital network ("ISDN") whereby data and voice are distinguished as packets of information split into a plurality of channels. In a preferred embodiment, an off premises extension ("OPX") is utilized to connect the voice path from the voice switch to the remote agent. Plain old telephone service ("POTS") may also provide a voice and data connection to handle transactions.

At the core of the system is a network coordinator. The network coordinator is able to directly communicate between both remote agent and the call center client. The network coordinator maintains a database on each of the remote agents which includes the scheduled times the remote agent is available to work and for which call center clients the remote agent is trained and authorized to work for. The network coordinator is integrally tied to every transaction as the remote agents are paid on a per-call basis. In a preferred embodiment, the network coordinator tracks each call transaction between the remote agent, the customer and the call center client. The network coordinator then assembles the information to provide payroll, silent monitoring and real-time call statistics on every aspect of the transaction. Because the network coordinator is directly tied to the voice switch, it can provide seamless supervisory assistance and silent monitoring abilities for each client call center. In a preferred embodiment, the remote agents, network coordinator and call center client all have real-time e-mail capability for communicating with each other.

The remote agent's computer generally runs two applications simultaneously. The first application is tied to a network coordinator that oversees the entire remote agent process for a plurality of clients. The first application provides call connection status, remote agent availability and other real-time information to the network coordinator. This permits the network coordinator to determine which remote agents are actively handling calls and which agents are idle. If one or more remote agents scheduled to handle calls for a particular client are idle for an extended period of time, the network coordinator may give the remote agents the opportunity to handle calls for a client for which they are trained that needs additional assistance. The second application is a direct connection to the call center client's transactional computer for call processing. For example, a remote agent handling sales for a catalog would enter in the customer's selection of merchandise, shipping address and credit card information into the call center client's computer. This may be accomplished using whatever protocol and terminal emulation is necessary for ordering processing. For example, for a mainframe system, the remote agent may utilize a 3270 terminal emulation through a TCP/IP-based telnet client. However, the terminal connection may be web-based (HTML), ANSI, VT-100 or other configuration depending on the network type utilized by the call center client.

In a preferred embodiment of the invention, both the call centers and the remote agents are customers of the network coordinator. Call centers pay a usage fee to access the remote agents trained for its facility. Remote agents pay a monthly connection fee. To maximize productivity, the remote agents preferably work in two-hour shifts. Therefore, for every full time employee ("FTE") requirement (1×8 hours), four fully trained remote agents are utilized (4×2 hours). The remote agents are utilized both on a scheduled and overflow emergency basis.

Accordingly, it is an object of the present invention to provide a network coordinator system that pools a plurality of remote agents that are specially trained to accept and process calls for a plurality of different call center clients. The network coordinator provides quality control, payroll service, voice and data connections, and a training infrastructure to enable the system.

It is another object of the present invention to provide a highly dynamic system for handling emergency crisis cases with previously trained and authorized remote agents that can be summoned in the event their services are needed, even on an infrequent basis. For example, federal regulations in the United States require airlines to provide call center services in the event of an aviation emergency. However, it would be impractical to maintain a large full-time call center that is only utilized a few times every year. Using the system in the present invention, hundreds of remote agents could be trained to handle inquiry calls from concerned family members in the event an emergency occurs, those remote agents could be contacted and put online in minutes.

It is another object of the present invention to provide a viable source of employment to a highly qualified workforce that for various reasons must work from home. For many individuals with disabilities, infirmities or other limitations on their physical capacity, a standard eight-hour work day is unfeasible. However, by providing them with the opportunity to work reduced-hour shifts for a plurality of call center clients, this undervalued workforce may be utilized to the mutual benefit of both employee and employer.

An advantage of the invention is that, through a network coordinator, call centers clients have access to a large pool of highly trained, motivated individuals that are paid on a per-call basis. The call center clients minimize the capital outlay necessary to service highly fluctuating customer initiated inbound calls.

DETAILED DESCRIPTION OF THE PREFERRED EMBODIMENT

Figure 1:
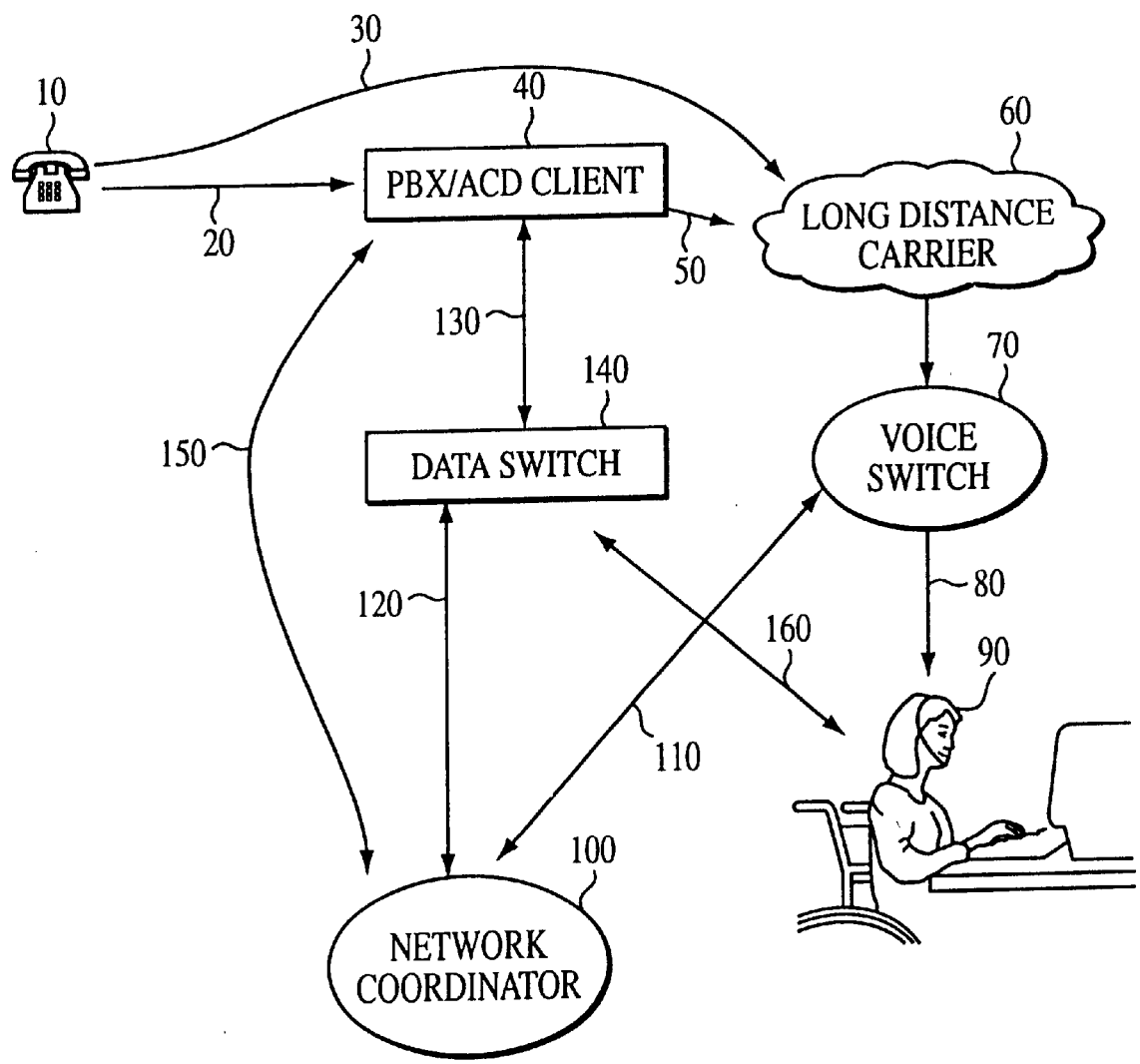
FIG. 1 is a flow diagram of the operation of applicant's invention illustrating the general telecommunication pathways.

Referring initially to FIG. 1 of the drawings, in which like numerals indicate like elements throughout the several views, in a preferred embodiment a customer-initiated telephone call 10 may travel by local lines 20 to a call center client 40. The call center client 40 typically has an existing automatic call distributor ("ACD") and public branch exchange ("PBX") system that has the ability to transfer overflow calls to remote locations. A PBX is a telephone system within an enterprise that switches calls between enterprise users on local lines while allowing all users to share a certain number of external phone lines. Most PBX switches also have the ability to be networked together via leased lines. This allows remote offices to be "tied" together reducing call traffic and producing substantial long distance rate savings.

Overflow calls from the call center client 40 may be forwarded to a long distance carrier 60 by a second connection 50. The second connection 50 may comprise a high-bandwidth data connection such as a 1.544 Mb/s T-1, 45 Mb/s T-3, 800 service, or comparable connection. Alternatively, the customer-initiated call 10 may bypass the call center client 40 altogether and connect directly to a voice switch 70. Overflow calls routed through the call center client 40 also connect to the voice switch 70. In a preferred embodiment, the voice switch 70 comprises a central office switching center, such as the Nortel® DMS 100, that serves the local level public switching network. Also called a Class 5 end office, the voice switch is operated by local exchange carriers ("LECs") and is designed for end office use.

The voice switch 70 is connected to a network coordinator 100. The network coordinator 100 maintains a live database of all the available remote agents 90 trained and authorized to service calls for the particular call center client 40. The remote agent 90 provides predetermined blocks of time for which her or she is available to receive calls. The call center client 40 estimates the number of remote agents needed to service calls for a particular time slot and the network coordinator 100 schedules a corresponding number of remote agents 90 to fill the requirement. The network coordinator 100 is integrally tied to every transaction as the remote agents 90 are paid on a per-call basis. In a preferred embodiment, the network coordinator 100 assembles payroll information as a service to the call center client 40, who in turn compensates the remote agent 90 for their services.

The direct connection between the network coordinator 100 and the voice switch 70 enables the network coordinator to provide seamless supervisory monitoring of the calls without "clicking" sounds known in other systems. Furthermore, the network coordinator 100 may provide this "silent monitoring" to the call center client 40 to enable the client to evaluate the verbal transactions that take place between the remote agent 90 and the customer 10. The direct connection to the voice switch 70 enables either the network coordinator 100 or the call center client 40 to provide supervisory assistance to the remote client 90 as needed. The network coordinator 100 may also provide real-time call statistics to the call center client 40 to evaluate the performance of the remote agent 90. In a preferred embodiment of the invention, the remote agent 90, the network coordinator 100 and the call center client 40 have real-time email or electronic chat capability so that information may be distributed without interrupting any ongoing voice connections.

The telecommunication connections to and from the remote agent 90 are well known within the industry. In a preferred embodiment, voice communications 160 between the voice switch 70 and the remote agent 90 are established by an off premises extension ("OPX"). An OPX generally refers to any telephone extension not located on the same premise as the telephone system of which it is a part. A data connection 160 between the remote agent 90 and a data switch 140 continues on through a data path 130 to the client for caller transaction information and email. In a preferred embodiment, the data path 160 may utilize POTS or ISDN depending on the bandwidth requirements and available equipment. The data path 130 between the data switch 140 and the call center client 40 is best established using a data frame relay. Frame relay is a telecommunication service designed for cost efficient data transmission for intermittent traffic between LANs and between end-points in a WANs. Frame relay puts data in a variable-size unit called a frame and leaves any necessary error correction (retransmission of data) up to the end-points, which speeds up overall data transmission.

Because the remote agent 90 may service calls for a plurality of call centers, it is preferable that the network coordinator 100 provide payroll support for the multiple call center clients serviced by the remote agent 90. The network coordinator 100 inherently monitors the call status, duration, availability and other information relating to the remote agent 90. This information may be compiled for accounting on a per-call basis, hourly basis, sales basis or whichever method of compensation is agreed upon. The payroll information may be directly delivered 150 from the network coordinator 100 to the call center client 40.

Figure 2:
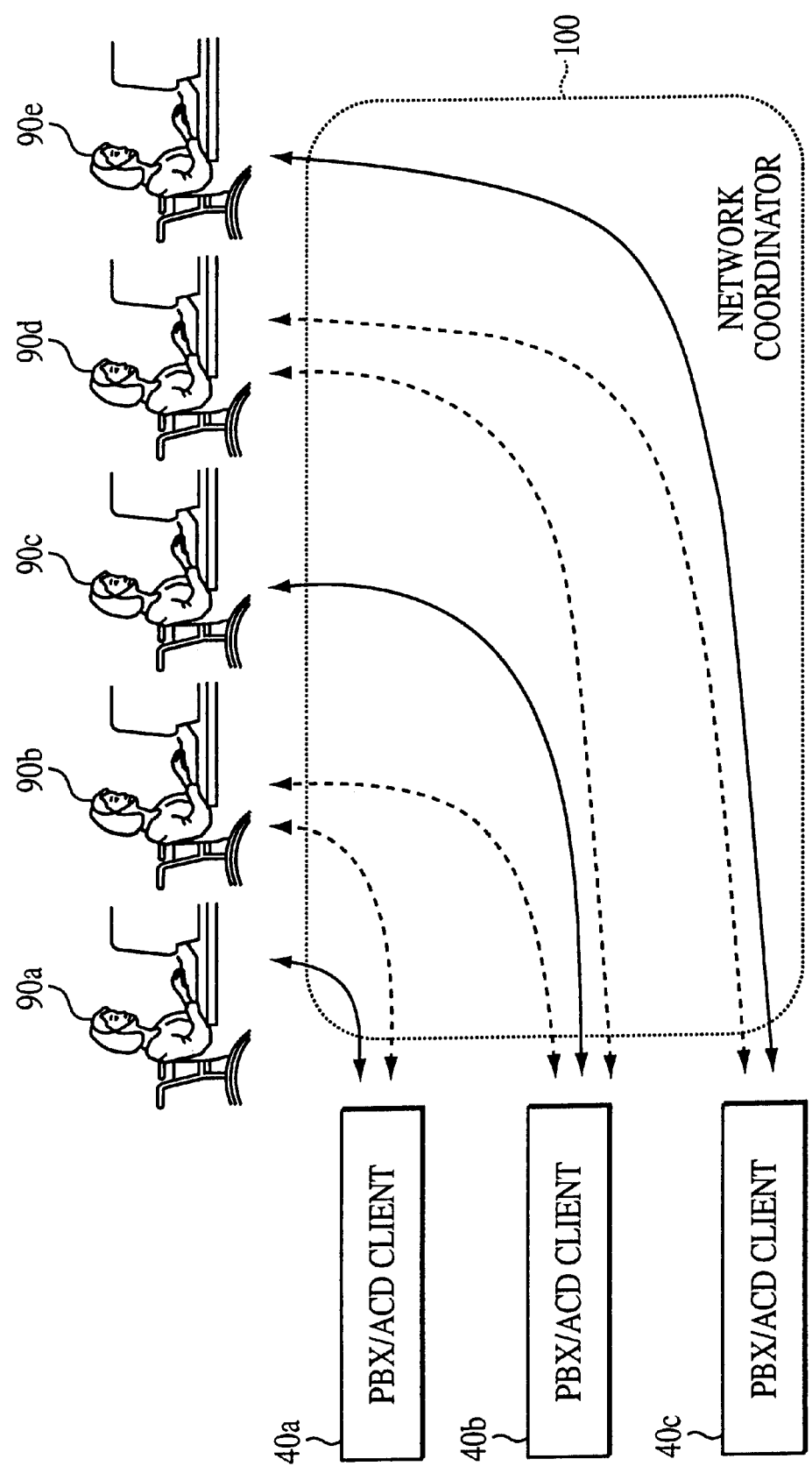
FIG. 2 is a flow diagram of the operation of the applicant's invention illustrating the multi-client servicing design of the network

FIG. 2 is illustrative of the operation of the system wherein multiple call center clients 40a–c are serviced by a plurality of remote agents 90a–e. As an example, remote agent 90b is trained and authorized to service calls from both call center client 40a and call center client 40b. Remote agent 90b is scheduled to work from 4:00 p.m. to 6:00 p.m. for call center client 40a. The schedule of remote agent 90b is registered with the network coordinator 100 whereby only authorized and scheduled remote agents may log on to the system to accept calls. The number of remote agents assigned to handle calls is predetermined by the call center client based on anticipated needs. However, suppose that in the example, remote agent 90b finds that call center client 40a overestimated its need for remote agents and remote agent 90b is idle. The network coordinator 100 may determine that call center client 40b requires additional assistance than previously forecasted. The network coordinator 100 then confirms that remote agent 90b has been trained and authorized to handle calls for call center client 40b and that the remote agent is idle. The network coordinator 100 then sends email to remote agent 90b offering a switch to accept customer-initiated calls for call center client 40b. The remote agent 90b may then switch over and begin accepting calls for call center client 40b.

In a preferred embodiment of the invention, the remote agents are paid on a per-call basis. This structure encourages them to actively seek out work throughout the system managed by the network coordinator. Additionally, because the remote agents are paid for each call, the system encourages them to train and qualify to handle multiple call center clients. This benefit is returned to the call center client who gain a large pool of remote agents that may be activated on an ad hoc basis.

Referring back to FIG. 2, remote agents 90a, 90c, and 90e are trained and authorized to accept calls, designated by a solid line, only to a single call center client 40. However, remote agents 90b and 90d are trained and authorized to accept calls, designated by dashed lines, to multiple call center clients. By the implementation of the multiple client remote agent network method, the call center clients 40a–c greatly expand the size and capacity of their workforce with little to no additional expense. Simultaneously, the remote agents greatly expand their employment opportunities and work schedules by working for multiple call center clients.

Accordingly, it will be understood that the preferred embodiment of the present invention has been disclosed by way of example and that other modifications and alterations may occur to those skilled in the art without departing from the scope and spirit of the appended claims.

What is claimed is:

1. A method of providing automatic call distribution service to one or more remotely located agents trained to service calls for a plurality of client call centers, comprising the steps of:

receiving a customer-initiated telephone call at a call center;

routing the customer-initiated telephone call through a carrier to a voice switch;

deriving an array of caller information from the voice switch;

transmitting the array of caller information relating to the customer-initiated telephone call to a network coordinator servicing a plurality of different call centers, the network coordinator identifying at least one remotely located agent trained to service calls for a plurality of client call centers and authorized to receive the customer-initiated telephone call for the call center;

directing the customer-initiated telephone call from the voice switch to the designated remote agent;

tracking the number of calls handled by a remotely located agent for the call center and providing payroll services for the call center on behalf of the remotely located agent; and rendering supervisory assistance from the call center wherein a supervisor at the call center may tap into the voice switch to assist in customer-initiated telephone call.

2. The method of claim 1, further comprising the steps of the network coordinator maintaining statistical records of each customer-initiated telephone call and providing the statistical records to the call center.

3. The method of claim 1, further comprising the steps of utilizing electronic mail for communication between the network coordinator, the remotely located agent and the call center.

4. The method of claim 1, further comprising the steps of monitoring the voice conversations taking place in the customer-initiated call through the voice switch by the network coordinator and the network coordinator providing access to the voice conversations to the call center.

5. A method of providing automatic call distribution service to one or more remotely located agents trained to service calls for a plurality of client call centers, comprising the steps of:

receiving a customer-initiated telephone call at a voice switch;

deriving an array of caller information from the voice switch;

transmitting the array of caller information relating to the customer-initiated telephone call to a network coordinator servicing a plurality of different call centers, the network coordinator identifying at least one remotely located agent trained to service calls for a plurality of client call centers and authorized to receive the customer-initiated telephone call for the call center;

directing the customer-initiated telephone call from the voice switch to the designated remote agent;

tracking the number of calls handled by a remotely located agent for the call center and providing payroll services for the call center on behalf of the remotely located agent; and rendering supervisory assistance from the call center wherein a supervisor at the call center may tap into the voice switch to assist in customer-initiated telephone call.

6. The method of claim 5, further comprising the steps of the network coordinator maintaining statistical records of each customer-initiated telephone call and providing the statistical records to the call center.

7. The method of claim 5, further comprising the steps of utilizing electronic mail for communication between the network coordinator, the remotely located agent and the call center.

8. The method of claim 5, further comprising the steps of monitoring the voice conversations taking place in the customer-initiated call through the voice switch by the network coordinator and the network coordinator providing access to the voice conversations to the call center.

9. A method of providing automatic call distribution service to one or more remotely located agents trained to service calls for a plurality of client call centers comprising the steps of:

receiving a customer-initiated telephone call at a call center;

routing the customer-initiated telephone call through a carrier to a voice switch;

deriving an array of caller information from the voice switch;

transmitting the array of caller information relating to the customer-initiated telephone call to a network coordinator servicing a plurality of different call centers, the network coordinator identifying at least one remotely located agent trained to service calls for a plurality of client call centers and authorized to receive the customer-initiated telephone call for the call center;

directing the customer-initiated telephone call from the voice switch to the designated remote agent;

tracking the number of calls handled by a remotely located agent for the call center and providing payroll services for the call center on behalf of the remotely located agent;

maintaining statistical records of each customer-initiated telephone call and providing the statistical records to the call center;

utilizing electronic mail for communication between the network coordinator, the remotely located agent and the call center;

monitoring the voice conversations taking place in the customer-initiated call through the voice switch by the network coordinator and the network coordinator providing access to the voice conversations to the call center; and rendering supervisory assistance from the call center wherein a supervisor at the call center may tap into the voice switch to assist in customer-initiated telephone call.

10. A method of providing automatic call distribution service to one or more remotely located agents trained to service calls for a plurality of client call centers comprising the steps of:

receiving a customer-initiated telephone call at a voice switch;

deriving an array of caller information from the voice switch;

transmitting the array of caller information relating to the customer-initiated telephone call to a network coordinator servicing a plurality of different call centers, the network coordinator identifying at least one remotely located agent trained to service calls for a plurality of client call centers and authorized to receive the customer-initiated telephone call for the call center;

directing the customer-initiated telephone call from the voice switch to the designated remote agent;

tracking the number of calls handled by a remotely located agent for the call center and providing payroll services for the call center on behalf of the remotely located agent;

maintaining statistical records of each customer-initiated telephone call and providing the statistical records to the call center;

utilizing electronic mail for communication between the network coordinator, the remotely located agent and the call center;

monitoring the voice conversations taking place in the customer-initiated call through the voice switch by the network coordinator and the network coordinator providing access to the voice conversations to the call center; and rendering supervisory assistance from the call center wherein a supervisor at the call center may tap into the voice switch to assist in customer-initiated telephone call.

* * * * *